(12) United States Patent
El-Hoiydi et al.

(10) Patent No.: US 9,504,076 B2
(45) Date of Patent: Nov. 22, 2016

(54) PAIRING METHOD FOR ESTABLISHING A WIRELESS AUDIO NETWORK

(71) Applicant: Phonak AG, Stäfa (CH)

(72) Inventors: Amre El-Hoiydi, Neuchâtel (CH);
Dominique Aparicio, Cernier (CH);
Markus Buehl, Cudrefin (CH); Marc Secall, Constantine (CH); Christoph Schmid, Zimmerwald (CH); Rainer Platz, Colombier (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 14/654,592

(22) PCT Filed: Dec. 21, 2012

(86) PCT No.: PCT/EP2012/076665
§ 371 (c)(1),
(2) Date: Jun. 22, 2015

(87) PCT Pub. No.: WO2014/094877
PCT Pub. Date: Jun. 26, 2014

(65) Prior Publication Data
US 2015/0341973 A1   Nov. 26, 2015

(51) Int. Cl.
| | |
|---|---|
| *H04H 40/00* | (2009.01) |
| *H04W 76/02* | (2009.01) |
| *H04W 84/18* | (2009.01) |
| *H04H 20/61* | (2008.01) |
| *H04W 68/00* | (2009.01) |
| *H04W 4/20* | (2009.01) |

(Continued)

(52) U.S. Cl.
CPC .......... *H04W 76/023* (2013.01); *H04H 20/61* (2013.01); *H04W 4/206* (2013.01); *H04W 68/005* (2013.01); *H04W 84/18* (2013.01); *H04R 25/554* (2013.01); *H04W 8/005* (2013.01)

(58) Field of Classification Search
USPC ...... 455/550.1, 41.1, 41.2, 41.3, 3.06, 556.1
See application file for complete search history.

(56) References Cited

U.S. PATENT DOCUMENTS

| | | | |
|---|---|---|---|
| 7,813,762 B2 | 10/2010 | Sanguino et al. | |
| 8,019,386 B2 | 9/2011 | Dunn et al. | |

(Continued)

FOREIGN PATENT DOCUMENTS

| | | |
|---|---|---|
| EP | 1 701 567 A1 | 9/2006 |
| EP | 1 912 388 A2 | 4/2008 |

(Continued)

*Primary Examiner* — Fayyaz Alam
(74) *Attorney, Agent, or Firm* — David S. Safran (57) ABSTRACT

A method and system of establishing a wireless network for audio data transmission with a first and second audio devices having first and second transceivers, the first audio device being an audio signal transmission unit with a user operable switch, and the first and second audio devices being assistive listening devices. Periodically the second transceiver listens for pairing information, at at least one public frequency channel; operating the switch by the user to initiate pairing at any time during operation of the first audio device; the first transceiver transmitting pairing information at said at least one public frequency channel upon operation of the switch. The second audio device automatically pairs to the first audio device upon reception of pairing information from the first transceiver. The first and second transceivers are controlled so that reception of the pairing information from the first audio device is accepted by the second audio device.

44 Claims, 7 Drawing Sheets

(51) Int. Cl.
*H04W 8/00* (2009.01)
*H04R 25/00* (2006.01)

(56) References Cited

U.S. PATENT DOCUMENTS

| | | |
|---|---|---|
| 8,027,638 B2 | 9/2011 | Sanguino et al. |
| 8,150,057 B2 | 4/2012 | Dunn |
| 8,194,902 B2 | 6/2012 | Pedersen |
| 8,260,262 B2 | 9/2012 | Ben Ayed |
| 8,300,864 B2 | 10/2012 | Müllenborn et al. |
| 8,554,140 B2 | 10/2013 | Klemmensen |
| 8,650,613 B2 | 2/2014 | Nocera |
| 2008/0090524 A1* | 4/2008 | Lee ............... H04W 84/20 455/41.2 |
| 2009/0034591 A1* | 2/2009 | Julian ............... H04W 4/206 375/220 |
| 2010/0067723 A1* | 3/2010 | Bergmann ......... H04M 1/6066 381/315 |
| 2010/0303236 A1* | 12/2010 | Laaksonen ............ H04L 63/062 380/270 |
| 2011/0183620 A1* | 7/2011 | Eisenbach ........... H04M 1/7253 455/41.2 |
| 2012/0019379 A1* | 1/2012 | Ben Ayed ......... G08B 13/1436 340/539.1 |
| 2013/0157573 A1* | 6/2013 | Aldaz ................... H04W 4/008 455/41.2 |
| 2015/0170496 A1* | 6/2015 | King ...................... G08B 21/24 340/686.6 |

FOREIGN PATENT DOCUMENTS

| | | |
|---|---|---|
| EP | 2 020 784 A1 | 2/2009 |
| WO | 03/056746 A1 | 7/2003 |
| WO | 2008/098590 A1 | 8/2008 |
| WO | 2009/027770 A1 | 3/2009 |
| WO | 2010/108492 A1 | 9/2010 |
| WO | 2011/098141 A1 | 8/2011 |
| WO | 2012/056298 A2 | 5/2012 |

* cited by examiner

PM: Paging Message
PP: Paging Period
PLS: Paging Listening Slot
RLS: Reply Listening Slot

PRM: Pairing Request Message
PRP: Pairing Request Period
PRLS: Pairing Request Listening Slot
PILS: Pairing Information Listening Slot
PIM: Pairing Information Message

PAIRING METHOD FOR ESTABLISHING A WIRELESS AUDIO NETWORK

BACKGROUND OF THE INVENTION

Field of the Invention

The invention relates to a method and system for establishing a wireless network for audio data transmission between assistive listening devices; in particular, the invention relates to the pairing process required for establishing such network.

Description of Related Art

An assistive listening device is an audio signal transmission unit for transmitting audio signals via the wireless link, such as an RF link, or an audio signal receiver unit for receiving audio signals from another assistive listening device via such wireless link.

One type of wireless network for assistive listening devices such as hearing instruments uses an electromagnetic (i.e., far-field) link for connecting remote accessory devices, such as a wireless microphone, to an ear-level receiver device.

Typically, such remote wireless microphones are used by teachers teaching hearing impaired persons in a classroom (wherein the audio signals captured by the wireless microphone of the teacher are transmitted to a plurality of receiver units worn by the hearing impaired persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another typical application of assistive listening devices is the case in which, the transmission unit includes a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

U.S. Pat. No. 8,019,386 B2 relates to a hearing assistance system comprising a plurality of wireless microphones worn by different speakers and a receiver unit worn at a loop around a listener's neck, with the sound being generated by a headphone connected to the receiver unit, wherein the audio signals are transmitted from the microphones to the receiver unit by using a spread spectrum digital signals. The receiver unit controls the transmission of data, and it also controls the pre-amplification gain level applied in each transmission unit by sending respective control signals via the wireless link.

International Patent Application Publication WO 2008/098590 A1 relates to a hearing assistance system comprising a transmission unit having at least two spaced apart microphones, wherein a separate audio signal channel is dedicated to each microphone, and wherein at least one of the two receiver units worn by the user at the two ears is able to receive both channels and to perform audio signal processing at ear level, such as acoustic beam forming, by taking into account both channels.

One option to implement a wireless network for hearing instruments is to use a time division multiple access (TDMA) scheme with central or distributed network management, wherein one of the devices acts as a master and determines the time slots during which each network device may transmit data and communicates this transmission schedule to the participating devices. A device entering the network must first register with the network master and can subsequently request reservation of time slots to transmit its data to recipient devices, i.e., a device is allowed to transmit only once it has synchronized with the network. In case that the network uses a frequency hopping scheme, the master transmits the necessary information to the synchronized devices.

An example of a wireless network for hearing devices is described in U.S. Pat. No. 8,150,057 B2, wherein audio signals are transmitted from a plurality of wireless microphones worn by various speakers via the wireless network to a receiver unit worn by a listener. Each of the transmission devices has certain dedicated slots in the TDMA scheme for transmitting the audio signals captured by the microphone to the receiver unit.

Another example of a wireless network suitable for audio signal transmission is the Bluetooth standard.

U.S. Pat. No. 8,194,902 B2 relates to a wireless network comprising a binaural hearing aid and other components, like a mobile phone, wherein a TDMA structure is used in a frequency hopping scheme, and wherein, during acquisition/synchronization, the frequency hopping scheme has a reduced number of frequency channels and the new device activates its receiver at a rate different from the frame rate of the network until synchronization data is received from the master device, whereupon the frame timing of the new device is synchronized to the frame timing of the network.

In general, establishing a private communication network requires two steps: first, the devices have to be paired and then the devices have to be synchronized. The pairing procedure typically involves the exchange of the network ID and the network rules (i.e., rules concerning which device is allowed to communicate in which way with whom); the synchronization procedure involves the exchange of information concerning network protocol and timing (i.e., in order to synchronize to a "network clock"), frequency hopping sequence, etc.

In general, pairing may require user action, may occur automatically or may be done already at the manufacturer. For example, pairing between a Bluetooth headset and a mobile phone may require user action, whereas pairing between a computer mouse and a wireless dongle typically is done at the manufacturer. Typical issues concerning the pairing procedure are reliability (i.e., to ensure that pairing with the target device is successful), selectivity (i.e., to avoid inadvertent pairing with unwanted devices), intrusion avoidance (to avoid that an unwanted person is able to pair one of his devices), and privacy (to avoid unwanted persons to sniff pairing and become part of the network).

Whereas reliability can be achieved relatively easily by using a correctly budgeted inductive or RF link, various approaches are known in the art to contribute to selectivity, intrusion avoidance and privacy: pairing may be restricted in time by enabling pairing only during given time windows; such time window may be started, for example, by pressing a button or after power-up of the device. Shorter time windows enhance protection but make the system more difficult to handle. Pairing may be restricted in space, so that pairing is possible only if both devices are within a given range; for example, use of an inductive link inherently results in a severe range restriction. Pairing may be restricted by requiring certain user actions in order to confirm and permit pairing, such as by typing a PIN code on both devices, reading and verifying a PIN code, pressing an OK button, etc.

U.S. Pat. No. 8,554,140 B2 relates to an automatic pairing procedure for audio signal transmission/reception devices, such as a wireless microphone, a music player, a PC or an audio extension device of a TV set, wherein the range of pairing is adjustable by control of the transmission power; it is mentioned that the maximum allowable pairing distance may be set from 0.05 m to 0.5 m.

U.S. Pat. No. 8,300,864 B2 relates to an inductive digital link between a hearing system and a telephone apparatus, wherein the same link is used not only for pairing but also for audio data transmission. Pairing occurs automatically.

International Patent Application Publication WO 2010/1084921 A1 relates to an inductive near field audio data link between a mobile phone and a hearing aid, wherein the near field link is also used for pairing, with pairing occurring automatically.

U.S. Pat. No. 8,650,613 B2 relates to an automatic pairing procedure between Bluetooth devices.

U.S. Pat. No. 7,813,762 B2 and U.S. Pat. No. 8,027,638 B2 relate to a pairing procedure of an ear level audio receiver with a remote Bluetooth device, wherein the receiver may be provided with one or more push buttons by which pairing is facilitated.

International Patent Application Publication WO 2012/056298 A2 relates to pairing of the external part of a cochlea implant system to a remote device, wherein a RF far field link and a near field link are involved in parallel. The RF link is used for the desired communication with the remote device, whereas both the near field and RF link are used for pairing. An "initiate pair" command and a "confirm pairing" command are transmitted via the near field link, and a "pair" command and an "accept" command are transmitted via the RF link. It is mentioned that the devices could be configured such that either one or both of the devices may request pairing by a single button press.

SUMMARY OF THE INVENTION

It is an object of the invention to provide for a method and system of establishing a wireless network for audio data transmission between assistive listening devices, wherein the pairing procedure is simple and intuitive from the user's perspective, fast, reliable and selective.

According to the invention this object is achieved by a method and system as described herein.

The invention is beneficial in that, by designing the system such that operating a switch at the first device by the user at any time during operation of the first device initiates pairing and that the transceiver of the first device and the transceiver of the second device are controlled such that a pairing information message from the first device is accepted by the second device with a likelihood of more than 90% if the distance between the two devices is less than 0.1 m and with a likelihood of less than 10% if the distance between the first audio device and the second audio device is more than 1 m, with the public frequency channel(s) used during pairing and the audio data transmission channels being located in the same frequency range of 2.400 to 2.483 GHz, the system can be handled by the user in a very simple and intuitive manner. By "operation" of the first device it is meant that "operation" does not include start-up, booting or set-up phases of the first device, i.e., pairing can be initiated only during "normal" operation of the device.

Selectivity and a certain degree of privacy is provided by the relatively small maximum pairing distance, and, with only a single radio frequency range being necessary for both audio signal transmission and pairing, system design can be kept relatively simple.

Hereinafter, examples of the invention will be described with reference to the accompanying drawings.

DETAILED DESCRIPTION OF THE INVENTION

The present invention relates to a method and system for establishing a wireless network for audio data transmission between at least a first audio device and a second audio device, wherein the first and second audio devices are assistive listening devices and may be designed as an audio signal transmission unit for transmitting audio signals via a wireless RF link or as an audio signal receiver unit for receiving audio signals via the wireless RF link. The first audio device may be an audio signal transmission unit. The second audio device typically is an audio signal receiver unit from where the audio signals are supplied to means for stimulating the hearing of the user, typically a loudspeaker, but including any other type of stimulation, such as a cochlear implant electrode or an implantable eletromechanical actuator coupled to an ossicle or directly to the cochlea. The second audio device may be an ear level receiver unit connected to or integrated within a hearing instrument, or it may be connected to a loudspeaker system mounted or installed in a room.

Figure 1:
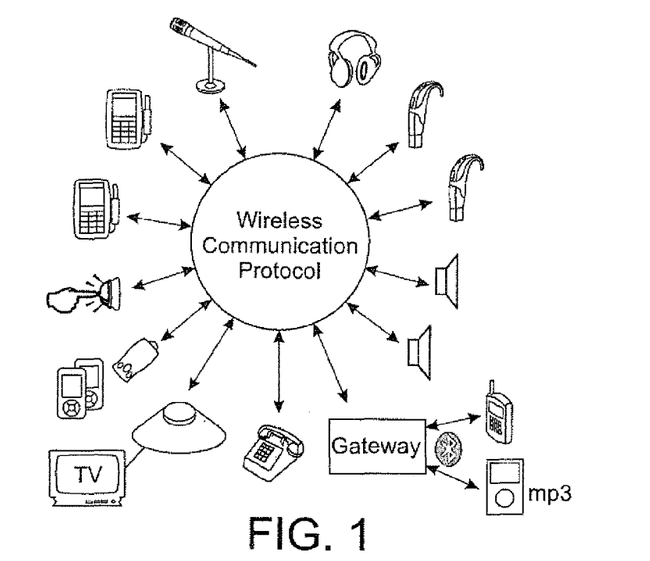
FIG. 1 is a schematic view of audio components which can be used with a system according to the invention.

FIG. 1 shows examples of audio devices which may form part of such wireless audio network. The devices used on the transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player; etc. The transmission devices include mobile (e.g. body-worn) devices as well as fixed devices. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons. Also on the receiver side a gateway could be used which relays audio signal received via a digital link to another device comprising the stimulation means.

The system may include a plurality of devices on the transmission side and a plurality of devices on the receiver side, for implementing the network topology, usually in a master-slave configuration (however, also distributed (decentralized) network control is an option).

The transmission unit may comprise or may be connected to a microphone for capturing audio signals, which is typically worn by a user, with the voice of the user being transmitted via the wireless audio link to the receiver unit. Alternatively or in addition the transmission may comprises an interface for receiving audio signals from external audio devices, such as a phone, a mobile phone, a music player, a TV set or a HiFi-set, via a wireless (e.g. Bluetooth) or plug-in connection (a schematic example of such system is shown FIG. 5).

The receiver unit typically is connected to a hearing aid via an audio shoe or is integrated within a hearing aid.

The wireless link between the transmission unit(s) and the receiver unit(s) is an electromagnetic (far-field) link.

In addition to the audio signals, control data may be transmitted between the transmission unit and the receiver unit. Such control data may include, for example, volume control or a query regarding the status of the receiver unit or the device connected to the receiver unit (for example, battery state and parameter settings). Alternatively, such control data transmission may be taken up by a third device, e.g. a remote control or status read-out device.

Figure 2:
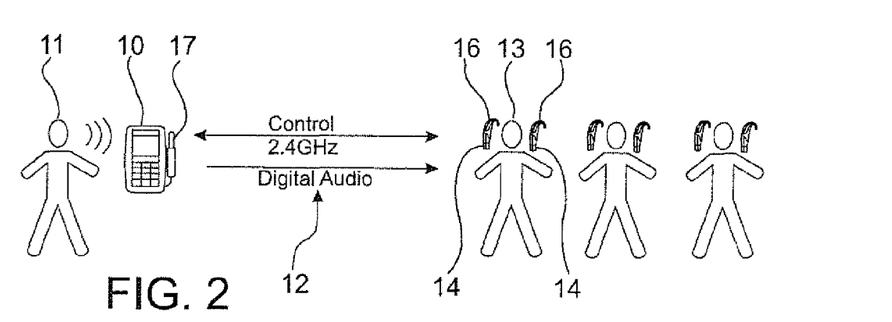
FIGS. 2 to 4 are schematic views of a use of various examples of a system according to the invention.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
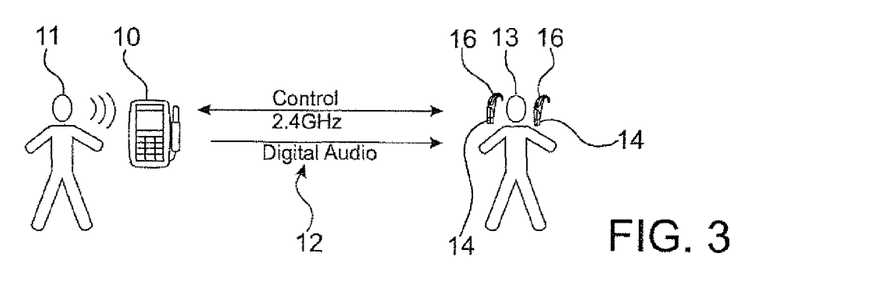

Another typical use case is shown in FIG. 3, wherein a transmission unit 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
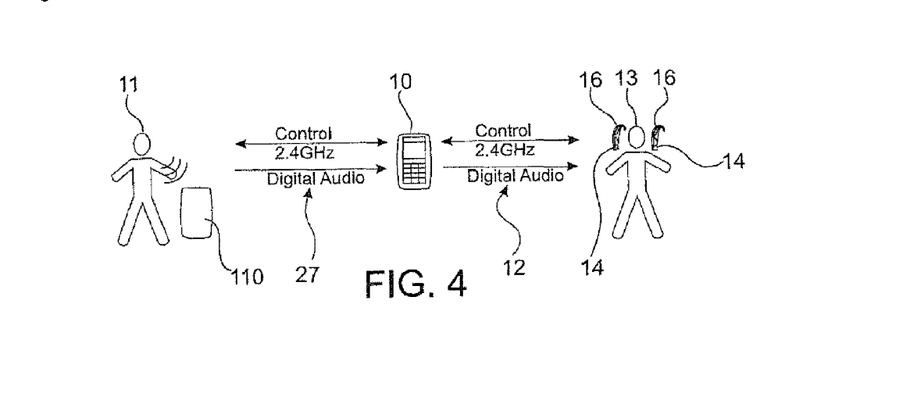

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4, the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source. In some cases, the microphone then may be omitted.

In each of such use cases, the transmission unit 10 usually comprises an audio signal processing unit (not shown in FIGS. 2 to 4) for processing the audio signals captured by the microphone or received from an external audio signal source prior to being transmitted.

In the embodiments of FIGS. 2 to 4, the link 12 is an electromagnetic (far-field) link.

Figure 5:
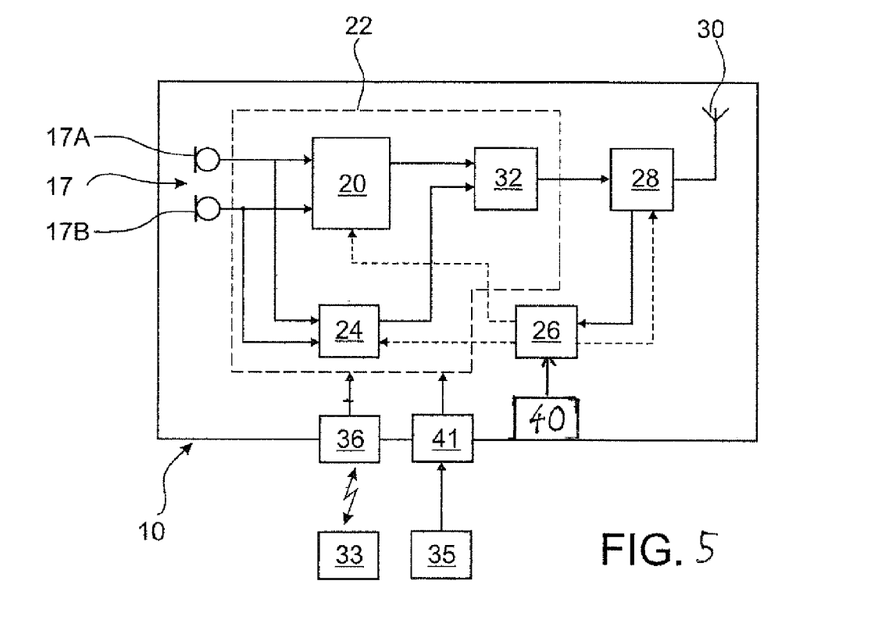
FIG. 5 is a block diagram of an example of a transmission unit to be used with the invention.

A block diagram of an example of a transmission unit 10 is shown in FIG. 5, which comprises a microphone arrangement 17 for capturing audio signals from the respective speaker's 11 voice, an audio signal processing unit 20 for processing the captured audio signals, a digital transceiver 28 and an antenna 30 for transmitting the processed audio signals as an audio stream composed of audio data packets. One function of the audio signal processing unit 20 is to compress the audio data using an appropriate audio codec, as it is known in the art. The compressed audio stream is transmitted via a digital audio link 12 established between the transmission units 10 and the receiver unit 14, which link also serves to exchange control data packets between the transmission unit 10 and the receiver unit 14.

The transmission units 10 may include additional components, such as a voice activity detector (VAD) 24. The audio signal processing unit 20 and such additional components may be implemented by a digital signal processor (DSP) indicated at 22. In addition, the transmission units 10 also may comprise a microcontroller 26 acting on the DSP 22 and the transceiver 28. The microcontroller 26 may be omitted in case that the DSP 22 is able to take over the function of the microcontroller 26. Preferably, the microphone arrangement 17 comprises at least two spaced-apart microphones 17A, 17B, the audio signals of which may be used in the audio signal processing unit 20 for acoustic beamforming in order to provide the microphone arrangement 17 with a directional characteristic.

The VAD 24 uses the audio signals from the microphone arrangement 17 as an input in order to determine the times when the person 11 using the respective transmission unit 10 is speaking. The VAD 24 may provide a corresponding control output signal to the microcontroller 26 in order to have, for example, the transceiver 28 sleep during times when no voice is detected and to wake up the transceiver 28 during times when voice activity is detected. In addition, a control command corresponding to the output signal of the VAD 24 may be generated and transmitted via the wireless link 12 in order to mute the receiver units 14 or saving power when the user 11 of the transmission unit 10 does not speak. To this end, a unit 32 is provided which serves to generate a digital signal comprising the audio signals from the processing unit 20 and the control data generated by the VAD 24, which digital signal is supplied to the transceiver 28.

In addition to the VAD 24, the transmission unit 10 may comprise an ambient noise estimation unit (not shown in FIG. 5) which serves to estimate the ambient noise level and which generates a corresponding output signal which may be supplied to the unit 32 for being transmitted via the wireless link 12.

The transmission unit 10 also may comprise inputs for audio signals supplied by external audio sources 33 and 35, such as a plug-in interface 41 and/or a wireless interface 36, such as a Bluetooth interface. Such external audio sources 33, 35 may be, for example, a phone, a mobile phone, a music player, a computer or a TV set. In particular, by providing such interfaces 36, 41 a plurality of audio signal input channels to the transmission unit 10 are realized.

According to one embodiment, the transmission units 10 may be adapted to be worn by the respective speaker 11 below the speaker's neck, for example, as a lapel microphone or as a shirt collar microphone.

Figure 6:
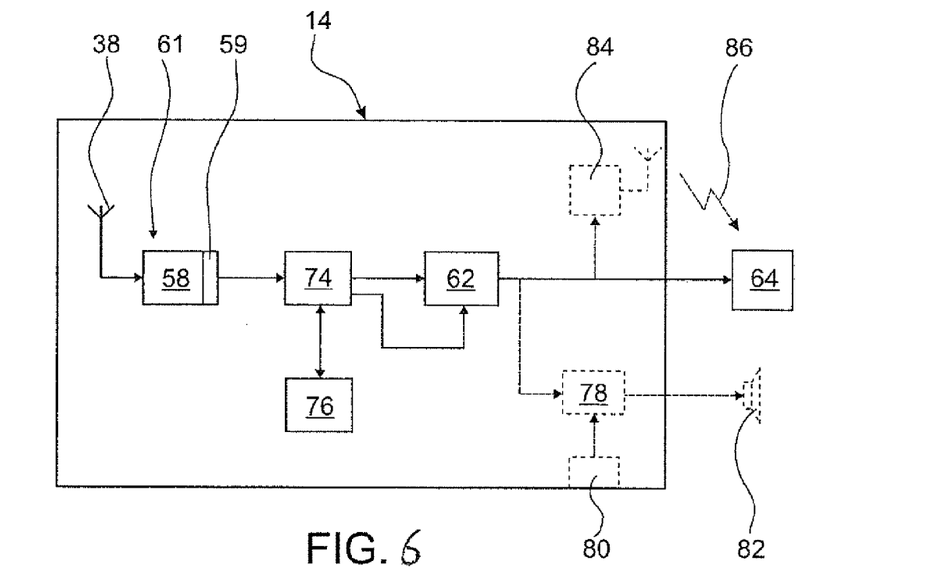
FIG. 6 is a block diagram of an example of a receiver unit to be used with the invention.

An example of a digital ear-level receiver unit 14 is shown in FIG. 6, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g. equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. Alternatively, the audio signals may be supplied as digital signals to the hearing aid. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be done remotely from the transmission unit 10 by transmitting corresponding control commands to the receiver unit 14.

Another alternative implementation of the receiver unit may be a neck-worn device having a transmitter 84 for transmitting the received signals via with an magnetic induction link 86 (analog or digital) to the hearing aid 64 (as indicated by dotted lines in FIG. 6).

In order to establish a network of audio devices, such as a transmission unit 10 and a receiver unit 14, it is first necessary to pair the devices, whereby pairing information, such as the network ID and information concerning pairing policy, is provided to each device which is to become part of the network. In the present case, before the pairing procedure between two devices can start, one of the two devices is provided with the necessary pairing information. For example, the transmission unit 10 may be provided with the information concerning pairing policy and with the capability of creating a network ID at the manufacturer or later via a firmware update.

Figure 7:
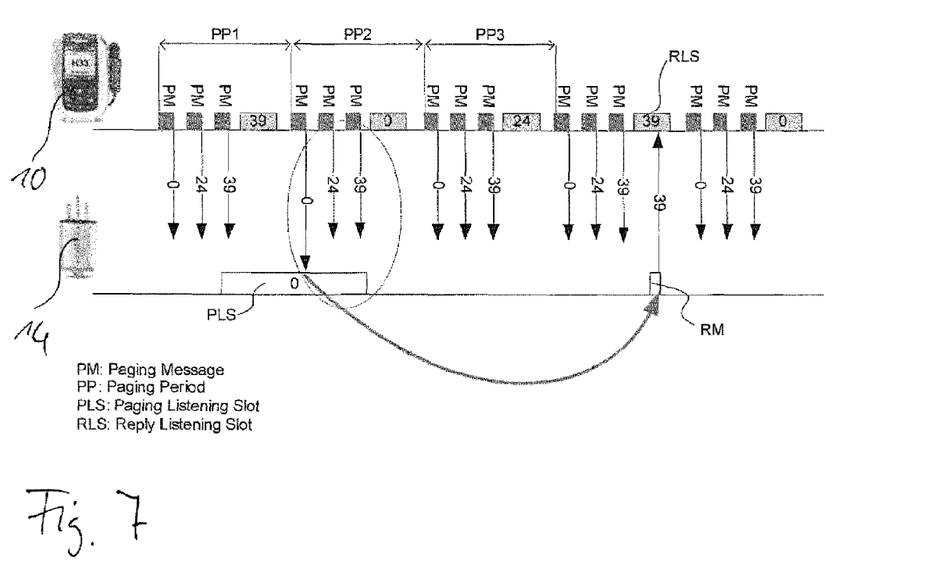
FIG. 7 shows an example of the signal exchange scheme between two audio devices during pairing.
Figure 8:
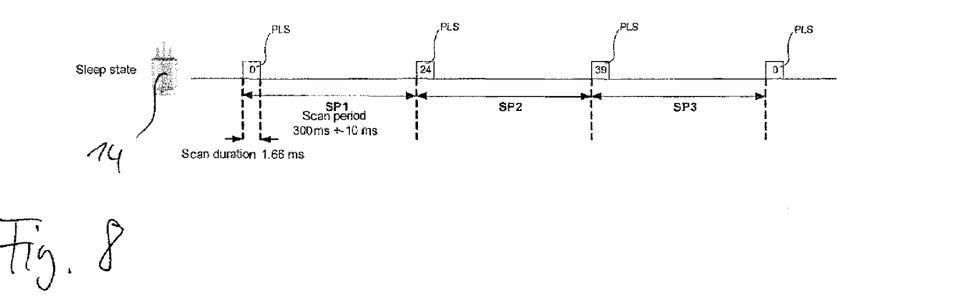
FIG. 8 is an illustration of the scanning scheme of the target device during the pairing procedure of FIG. 7.

An example of a pairing procedure between a transmission unit 10 and a receiver unit 14 is shown in FIGS. 7 and 8. In general, the transmission unit 10 (hereinafter also referred to as "paging device"), when pairing with the receiver unit 14 is to be initiated, may be already synchronized within a network with other audio devices, or the receiver unit 14 may be the first device to become part of the network. In order to be capable to initiate pairing, the respective audio device is provided with a switch operable by the user to initiate pairing at any time when the switch is operated. In the present example, the transmission unit 10 of FIG. 5 is provided with a switch 40 which, when operated by the user, provides the microcontroller 26 (or the DSP 22 in case that no microcontroller 26 is present) with a corresponding signal. The switch 40 preferably is designed such that it is operated by a single touch of the user. For example, the switch 40 may be implemented as a button to be pressed by the user.

Figure 9:
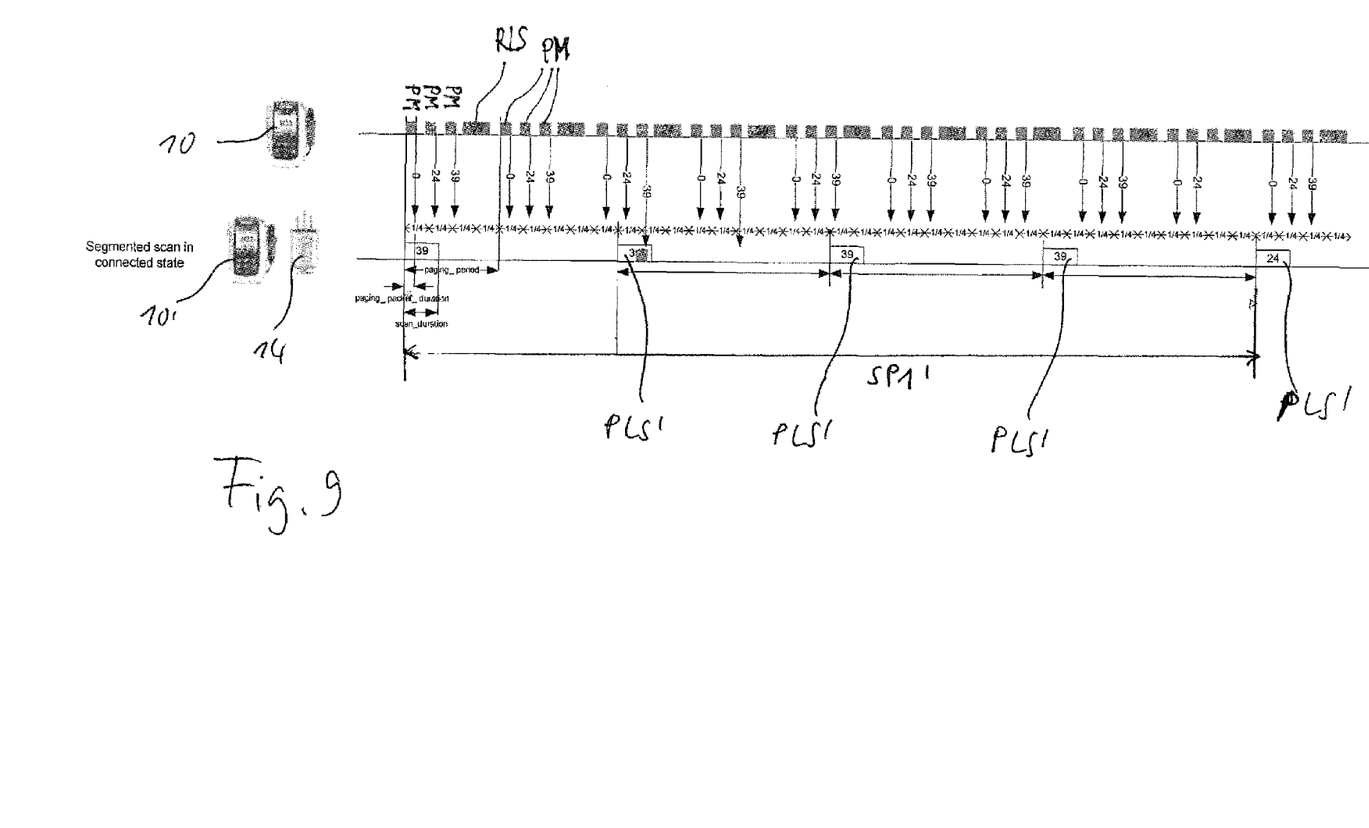
FIG. 9 is a view like FIG. 7, wherein an alternative example is shown.

Upon operation of the switch 40, the microcontroller 26 (or the DSP 22) causes the transceiver 28 to transmit a paging message "PM" containing the necessary pairing information. Typically, the paging message is transmitted as a single data block/packet with a duration of e.g. 160 µs. Transmission of the paging message is periodically repeated in subsequent paging periods PP (PP1, PP2, etc.), with the paging message being transmitted at least once in each paging period at at least one public frequency channel. In the example of FIG. 7, the duration of each paging period PP is 1.44 ms. Preferably, there are not more than three public frequency channels. In the examples of FIGS. 7 to 9 there are three public frequency channels denoted "0", "24" and "39".

Typically, transmission of the paging message is repeated according to a sequence of the public frequency channels, which may be the same for each paging period. Preferably, transmission of the paging message is repeated within each paging period at least once, wherein each transmission of the paging message within each paging period is at a different one of the public frequency channels. Typically, within each paging period the paging message is transmitted once at each of the public frequency channels.

Such an example is illustrated in FIG. 7, wherein in each paging period the paging message is transmitted once at each of the public frequency channels 0, 24, 39, and wherein this sequence is the same for each paging period. Each paging period also contains, typically at the end, a reply listening slot RLS during which the transceiver 28 listens at one of the public frequency channels for a reply from the device to be paired. Typically, the reply listening slot uses each of the public frequency channels according to a fixed repeated sequence which contains each of the public frequency channels once. In the example of FIG. 7, the transceiver 28 listens in the first paging period PP1 at the channel 39, in the second paging period PP2 at the channel 0 and in the third paging period PP3 at the channel 24, with this sequence then being repeated.

The transceiver 28 may stop transmission of the paging message after having received a pairing reply message in the reply listening slot RLS or after a timeout limit of the time having passed since the switch 40 has been reached (such timeout limit may be, for example, 2 seconds).

If the paging device is part of a TDMA network, transmitting or receiving audio, as a master or a slave of the network, then the device will stop the TDMA activity for the duration of the paging. If the device was a slave of a network, it will synchronize to the network again after the paging. If the device was the master of the network, the network will be down for the duration of the paging, and all slaves will synchronize back to the master once the master starts again sending beacons.

The device to be paired (hereinafter also referred to as "scanning device"), i.e., the receiver 14 in the examples of FIGS. 7 to 9, listens, via its transceiver 61, during a paging listening slot PLS at at least one public frequency channel for a paging message from the other device (i.e., the transmission unit 10 in the examples of FIGS. 7 to 9); such listening is periodically repeated in subsequent scanning periods SP (SP1, SP2, etc.) until a paging message has been received. Typically, there is only a single listening slot PLS in each scanning period SP. Preferably, the transceiver 61 listens in each listening slot at one of the public frequency channels different from the public frequency channel of the preceding listening slot. Typically, the transceiver 61 listens in each listening slot at one of the public frequency channels according to a fixed repeated sequence, wherein the sequence preferably contains each of the public frequency channels once (in the example of FIG. 8, a sequence of the channels 0, 24, 39 is repeated).

In the example of FIG. 7, the duration of the listening slot PLS is 1.66 ms, and the duration of the scanning period SP is about 300 ms; the duration of the listening slot SL and the duration of the scanning period SP are selected as a function of the duration of the paging period PP and the timing of the transmission repetition of the paging message.

The paging listening slot PLS duration is typically dimensioned such that the frequency and time window of the listening slot will match at least one paging packet transmission with 100% probability. This property is guaranteed if the duration of the listening slot is equal to the duration of the paging period+one paging message+safety margin. The safety margin is a time margin, of typically 20 µs, meant to cover potential time jitter or clock differences between devices.

As indicated in FIG. 7, the scanning device transmits, at one of the public frequency channels, a pairing reply message RM after having successfully received a paging message from the paging device. There may be some delay after receipt of the paging message until the pairing reply message RM is sent; The pairing reply message (RM) may be sent in the first reply listening slot (RLS) following the received pairing paging message (PM). The public frequency channel to be used for transmission of the reply message RM is indicated in the paging message PM.

In the example of FIGS. 7 and 8 the receiver unit 14 does not form part of any network. However, it may happen that the receiver unit 14 already forms part of a network when it is to be paired with the transmission unit. An example of such case is shown in FIG. 9. In such case, when the receiver unit 14 already receives audio data in its connected/synchronized state, the listening slot duration of 1.66 ms of FIG. 8 would be too long and has to be segmented. In the example of FIG. 9, the duration of the listening slot PLS' is only about one quarter of the duration of the listening slot PLS of the example of FIG. 8, i.e., the listening slot is divided into four portions, so that in the example of FIG. 9 the transceiver 61 listens at the same frequency channel 39 during the first scanning period SP1'.

In general, the duration of the listening slot and the duration of the scanning period have to be properly selected as a function of the paging message packet duration, the duration of the paging period and the number of public frequency channels in order to allow a deterministic rendezvous in time and frequency between the paging device and the scanning device.

In order to ensure privacy of the pairing at least to some degree, the transceiver of the paging device and the transceiver of the scanning device are controlled in such a manner that a paging signal from the paging device is accepted by the scanning device with a likelihood of more than 90% (preferably more than 99%) if the distance between the paging device and the scanning device is more than 0.1 m, and with a likelihood of less than 10% (preferably less than 1%) if the distance between the first audio device and the second audio device is more than 1 m. Thereby the effective pairing range is limited to not more than about 0.1 m. Typically, thereby pairing is safely excluded for distances of more than 1 m (i.e., the likelihood that a paging signal from the paging device is accepted by the scanning device is less than 10% if the distance is 1 m or more).

There are several options for achieving such pairing range limitation. For example, the transmission power of the transceiver of the paging device may be controlled in such a manner that a paging signal is accepted by the scanning device with a likelihood of more than 90% if the distance between the devices is less than 0.1 m. According to an alternative option, the gain applied in a power amplifier and/or the gain applied in a low noise amplifier of the transceiver of the scanning device is controlled such that a paging signal is accepted with a likelihood of more than 90% if the distance between the devices is less than 0.1 m.

According to a further alternative option, a threshold value of the acceptable minimum reception power at the antenna of the transceiver of the scanning device is set in such a manner that the paging signal is accepted with a likelihood of more than 90% if the distance between the devices is less than 0.1 m. In this case, the threshold value of the acceptable minimum reception power at the antenna of the transceiver of the scanning device may be controlled in such a manner that a paging signal is accepted by the scanning device with a likelihood of more than 90% if the distance between the devices is less than 0.1 m. Such threshold value may be adjustable in order to achieve a selectable and harmonized (among different products) pairing range. Thereby, variations in the antenna gain of the scanning device may be compensated by the scanning device. Preferably, the threshold value is transmitted in the network protocol, so that the pairing range would be selectable at the side of the paging device.

Upon reception of the pairing information from the first audio device (paging device) the second audio device (scanning device) is automatically (without the need for user interaction, such as confirmation by the user etc.) paired to the first audio device.

In general, the exchange of pairing information is not limited to the above described specific scanning/paging procedure. Rather, the minimum requirement is that the pairing information is transmitted from the first device to the second device upon operation of the switch at the first device.

The public frequency channels used for the pairing procedure also may be used for the frequency hopping synchronization of the devices after pairing. An example of a suitable frequency hopping synchronization procedure is described in International Patent Application Publication WO 2011/098141 A1.

Figure 10:
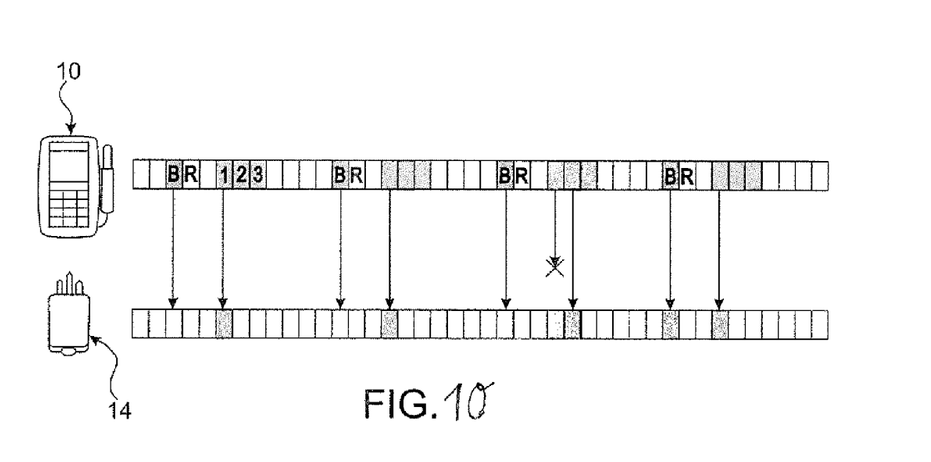
FIG. 10 shows an example of a TDMA scheme to be used in a wireless audio data network.

In FIG. 10, an example of a TDMA frame structure suitable for an audio data transmission network is shown.

The carrier frequencies for the digital link 12 are from 2.400 to 2.483 GHz. Examples of the digital modulation scheme are PSK/FSK, ASK or combined amplitude and phase modulations such as QAM, and variations thereof (for example, GFSK). The preferred codec used for encoding the audio data is sub-band ADPCM (Adaptive Differential Pulse-Code Modulation).

Preferably, data transmission occurs in the form of TDMA (Time Division Multiple Access) frames comprising a plurality (for example, 10) of time slots, wherein in each slot one data packet may be transmitted (alternatively, several data packets may be sent during a slot). In FIG. 10 an example is shown wherein the TDMA frame has a length of 4 ms and is divided into 10 time slots of 400 µs, with each data packet having a length of 160 µs.

Preferably, a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame may be allocated to the periodic transmission of a beacon packet which contains the sequence number numbering the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units.

At least some of the other slots are allocated to the transmission of audio data packets, wherein each audio data packet usually is repeated at least once, typically in subsequent slots. In the example shown in FIG. 10, three subsequent slots are used for three-fold transmission of a single audio data packet. The master device does not expect any acknowledgement from the slaves devices (receiver units), i.e., repetition of the audio data packets is done in any case, irrespective of whether the receiver unit has correctly received the first audio data packet or not. Also, the receiver units usually are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot.

When the receiver unit has correctly received already the first transmission of a certain audio data packet, it stops listening to the second and third transmission of the same audio data packet.

Preferably, not more than three public frequencies (channels) are used, which may correspond to the low mid and high part of the 2.400 GHz to 2.483 GHz band. For transmission of the audio signals between the synchronized network members for example, 40 channels may be used.

In general, all kinds of modulation may be used, such as Amplitude Shift Keying (ASK) with M modulation stages; Phase Shift Keying like BPSK, QPSK, 8-PSK or M-ary PSK; Frequency Shift Keying like BFSK, M-ary FSK, OFDM, CPFSK with two frequencies; Quadrature Amplitude Modulation (QAM), Spread Spectrum like DSSS (direct sequence spread spectrum) or FHSS (frequency hopping spread spectrum); and Pragmatic Trellis Code Modulation (PTCM).

As already mentioned above, in addition to audio data usually other kinds of data, such as control data, may be transmitted within the TDMA frame structures via the wireless link, i.e., the network.

Also, the frames, rather than having a pure TDMA structure, may have a structure corresponding to a combination of TDMA and FDMA, as used, for example, in telephone networks.

Preferably, the system is provided with a "contagious pairing" feature, wherein the second audio device (i.e., in the above example the scanning device), upon successful pairing with the first audio device (i.e., in the above example the paging device), will act as a "first device" (i.e., paging device) for other audio devices (i.e., new scanning devices) which are also to be paired. In this case, the second audio device is provided with a switch like the first device and typically is an audio signal transmission unit comprising or being connected to a microphone arrangement for capturing a speaker's voice, rather than being a receiver device as in the above example.

Figure 11:
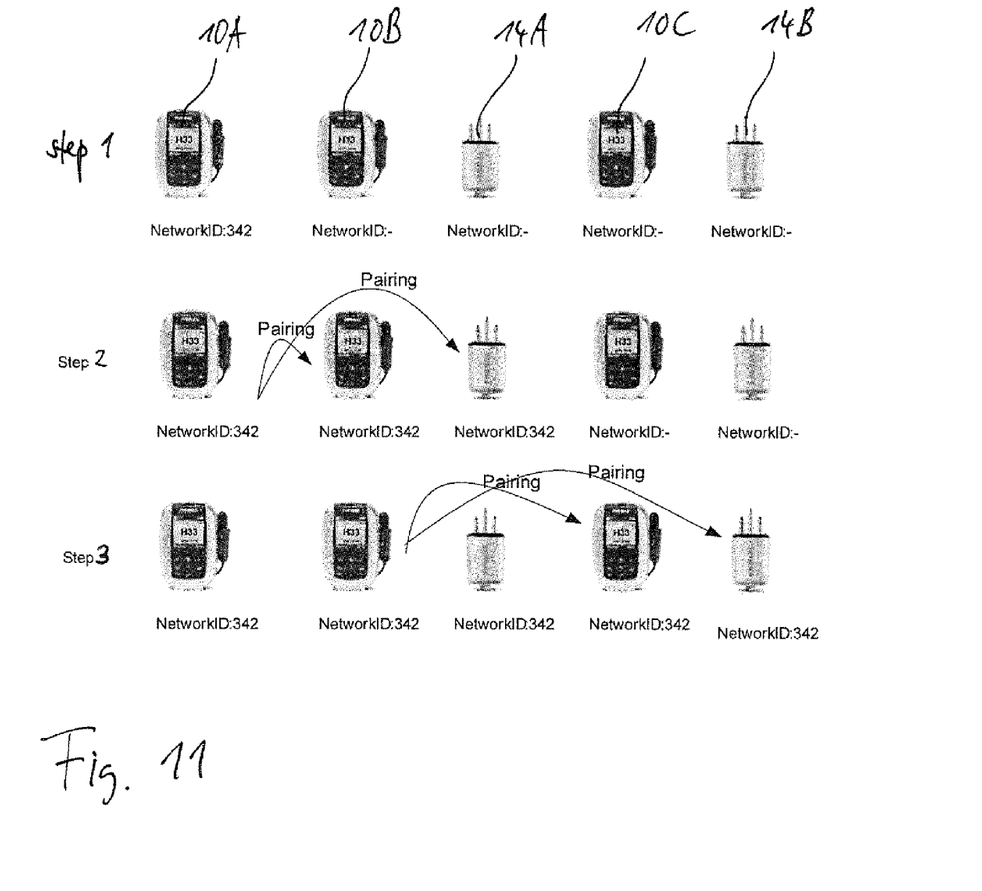
FIG. 11 shows a schematic illustration of a "contagious pairing" feature of the present invention.

A practical implementation is illustrated in FIG. 11. The audio device 10A is used to create a network. For example, a user may decide to generate a new network via a dedicated user interface action (dedicated menu, dedicated button, etc) on the audio device 10A (step 1 in FIG. 11). When a new network is generated, all previously stored pairing information is deleted on this device.

For example, a new 32 bits network ID may be generated using a pseudo random number generator, such as a linear congruent generator such as X=aX+c modulo m, where a=1664525, c=1013904223 and m=2^32 (see Numerical Recipes in C, The Art of Scientific Computing, Second Edition, CAMBRIDGE UNIVERSITY PRESS).

The hopping sequence ID for the network is formed using the 16 least significant bits of the 32 bits of the network ID. If the least significant bit is 0, it is set to 1 to ensure that the hopping sequence ID is odd.

In the example of FIG. 11, the random number '342" has been generated, serving as the new network ID.

In step 2, the device 10A (audio transmission unit) is used to pair devices 10B (audio transmission unit) and 14A (audio receiver unit) by operating switch 40 of device 10A, with device, 10A acting as the "first device" (paging device) and devices 10B and 14A acting as "second devices" (scanning devices). As a result, the devices 10B and 14A are provided with the network ID 342.

In step 3, the device 10B is used to pair audio devices 10C (audio transmission unit) and 14B (audio receiver unit) by operating a switch (not shown) of device 10B, with device 10B now acting as the "first device" (paging device) and devices 10C and 14B acting as "second devices" (scanning devices). As a result, also the devices 10C and 14B are provided with the network ID 342, thereby forming a network including all five devices.

Step 3 is an example of "contagious" pairing: The device 10B is able to pair further devices after having paired in step 2.

In the embodiments described so far, pairing of a second device, which is to be paired to a first device having the pairing information, is initiated by the first device sending the pairing information, for example, as a periodically repeated paging message, after having been activated by the user operating the switch at the first device. Pairing is completed upon reception of the pairing information by the second device, which thereupon may send an (optional) reply message to the first device.

According to a variant of the invention (hereinafter also referred to as "joinnet"), a first device is to be paired to a second device which has the pairing information. To this end, the first device, after having been activated by the user operating the switch at the first device, transmits a pairing request message to the second device, whereupon the second device, after having received the pairing request message, transmits the pairing information (e.g. network ID) to the first device which, upon receipt of the pairing information, is automatically paired to the second device.

For "joinnet" variant of the invention, the same transmission scheme as in the other cases may used, i.e., the timing and transmission frequencies of the messages would be the same, only the content/meaning of the messages would be different.

Figure 12:
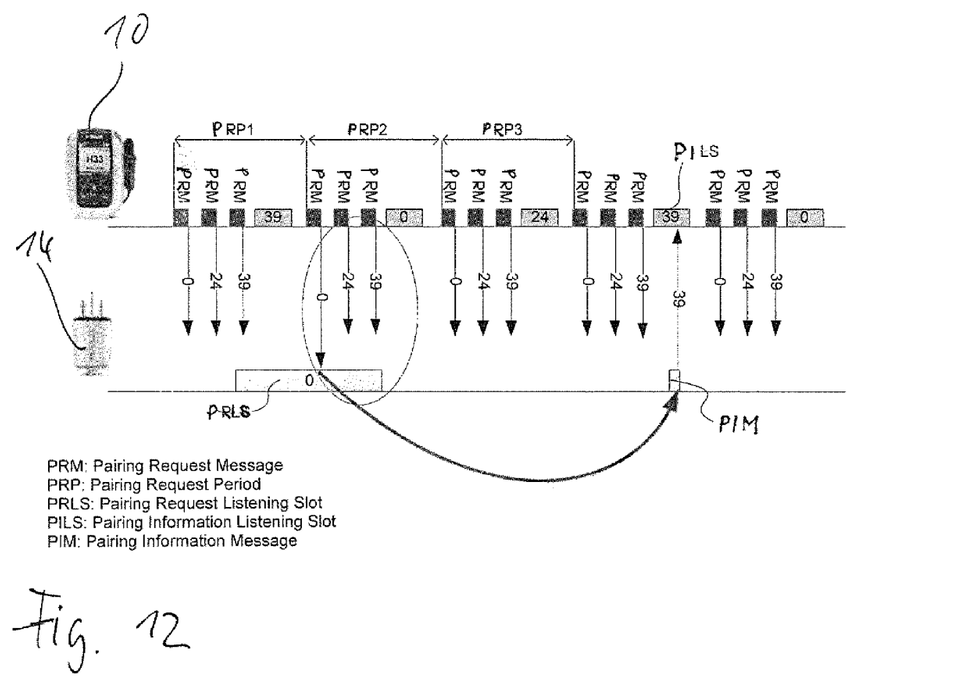
FIGS. 12 and 13 are views like FIGS. 7 and 8, respectively, wherein a further alternative example is shown.
Figure 13:
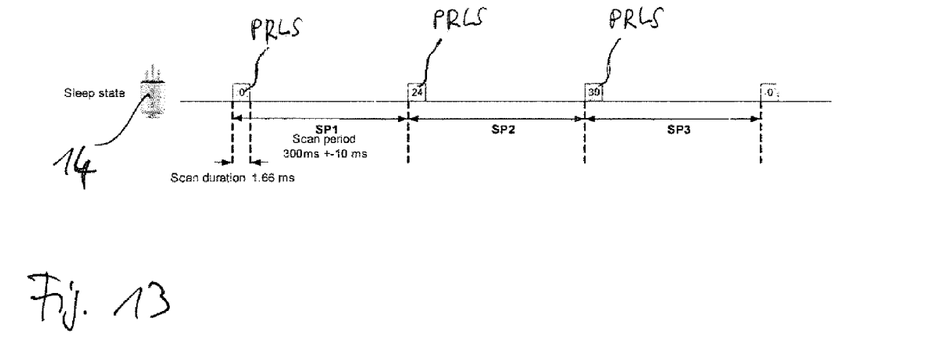

An example of a transmission scheme is shown in FIGS. 12 and 13, wherein the scheme of FIGS. 7 and 8 has been adapted accordingly: The paging messages PM of FIG. 7 correspond to the above mentioned pairing request messages PRM; the paging periods PP correspond to pairing request periods PRP during which the pairing request messages may be repeatedly transmitted at different public frequencies by the first device 10; the paging listening slots PLS correspond to pairing request listening slots PRLS during which the second device 14 listens for pairing request messages PRM; and the reply listening slots RLS correspond to pairing information listening slots PILS during which the first device 10 listens for the pairing information messages PIM (including network ID) sent by the the second device 14 (the pairing information messages PIM correspond to the reply messages of FIG. 7).

Also the "joinnet" variant may comprise a "contagious pairing" feature. For example, starting from the configuration shown in step 1 in FIG. 11, device 10B may first paired to the device 10A by sending pairing request messages PRM to the device 10A, thereby obtaining the network ID from device 10A by reception of a pairing information message PIM; the device 10B then will listen for pairing request messages PRM from other devices, such as the device 10C, in order to transmit pairing information messages PIM in response to the reception of a pairing request message PRM from the device 10C, thereby pairing the device 10C by providing it with network ID.

What is claimed is:

1. A method of establishing a wireless network for audio data transmission comprising a first audio device (10, 10A) having a first transceiver (28) and a second wireless audio device (10B, 10C, 14, 14A, 14B) having a second transceiver (61), wherein the first audio device is an audio signal transmission unit and comprises a switch (40) operable by a user (11, 13), wherein the first and second audio devices are assistive listening devices for enhancing speech understanding selected from the group consisting of audio signal transmission units for transmitting audio signals via a wireless RF link and audio signal receiver units for receiving audio signals via the wireless RF link; the method comprising:

periodically listening, via the second transceiver, at any time during operation of the second audio device, for pairing information, at at least one public frequency channel;

operating the switch by the user to initiate pairing, wherein pairing is initiated by operating the switch by the user at any time during operation of the first audio device;

transmitting pairing information containing a network ID via the first transceiver at said at least one public frequency channel upon operation of the switch; and automatically pairing the second audio device to the first audio device upon reception of said pairing information from the first transceiver;

wherein the first transceiver and the second transceiver are controlled in such a manner that reception of the pairing information from the first audio device is accepted by the second audio device with a likelihood of more than 90% if the distance between the first audio device and the second audio device is less than 0.1 m and with a likelihood of less than 10% if the distance between the first audio device and the second audio device is more than 1 m, and wherein said at least one public frequency channel and the audio data transmission use only frequencies in the range of 2.400 to 2.483 GHz, wherein the second audio device (10B) comprises a switch (40) that is operable by a user (11, 13), and wherein the second audio device, after pairing to the first audio device (10A), is caused to initiate pairing of a third audio device (10C, 14B) to the second audio device by transmitting at least one message (PM) containing said pairing information via the second transceiver upon operation of the switch of the second audio device.

2. The method of claim 1, wherein the second audio device (10B) is an audio signal transmission unit.

3. The method of claim 1, wherein said transmitting of pairing information comprises periodically repeating, in subsequent paging periods (PP), transmission of a paging message (PM) containing said pairing information, via the first transceiver (28), said transmission of the paging message occurring in each paging period at least once at said at least one public frequency channel; wherein said listening comprises periodically repeating, in subsequent scanning periods (SP), listening, via the second transceiver (61), during a listening slot (PLS), at said at least one public frequency channel, for a paging message; the method further comprising transmitting, via the second transceiver, a pairing reply message (RM) at least one public frequency channel after having received the paging message from the first transceiver.

4. The method of claim 3, wherein the first audio device (10, 10A) stops transmission of the paging message (PM) after having received the pairing reply message (PM) or after a timeout limit of the time having passed since the switch (40) of the first audio device has been operated has been reached.

5. The method of claim 3, wherein in each transmission the paging message (PM) is transmitted as a single data block.

6. The method of claim 5, wherein there is a plurality of public frequency channels, wherein transmission of the paging message (PM) is repeated according to a sequence of the public frequency channels.

7. The method of claim 6, wherein transmission of the paging message (PM) is repeated within each paging period (PP) at least once, wherein each transmission of the paging message within each paging period is at a different one of the public frequency channels.

8. The method of claim 7, wherein the sequence of the public frequency channels used for transmission of the paging message (PM) is the same for each paging period (PP).

9. The method of claim 7, wherein within each paging period (PP) the paging message (PM) is transmitted once at each of the public frequency channels.

10. The method of claim 3, wherein there is only a single listening slot (PLS) in each scanning period (SP).

11. The method of claim 10, wherein the second transceiver (61) listens in each listening slot (PLS) at one of the public frequency channels different from the public frequency channel of the preceding listening slot.

12. The method of claim 11, wherein the second transceiver (61) listens in each listening slot (PLS) at one of the public frequency channels according to a fixed repeated sequence.

13. The method of claim 12, wherein the sequence contains each of the public frequency channels once.

14. The method of claim 3, wherein when the second audio device (14) is in a synchronized state for receiving audio data from an audio device (10') other the first audio device (10), each scanning period (SP) contains a plurality of listening slots (PLS'), wherein the second transceiver (61)

listens at the same public frequency channel in each listening slot in the scanning period.

15. The method of claim 14, wherein the second transceiver listens in the listening slots (PLS') of each scanning period (SP) at one of the public frequency channels different from the public frequency channel of the listening slots of the preceding scanning period.

16. The method of claim 15, wherein the second transceiver (61) listens in each scanning period (SP) at one of the public frequency channels according to a fixed repeated sequence.

17. The method of claim 3, wherein the first transceiver (28) listens during each paging period (PP) once during a reply listening slot (RLS) at one of the public frequency channels.

18. The method of claim 17, wherein the first transceiver (28) listens in each reply listening slot (RLS) at one of the public frequency channels according to a fixed repeated sequence.

19. The method of claim 18, wherein the sequence contains each of the public frequency channels once.

20. The method of claim 1, wherein there are not more than three public frequency channels.

21. The method of claim 1, wherein the transmission power of the first transceiver (28) is controlled in such a manner that a message (PM) containing pairing information from the first audio device (10, 10A) is accepted by the second audio device (14, 10B, 10C, 14A, 14B) with a likelihood of more than 90% if the distance between the first audio device and the second audio device is less than 0.1 m and with a likelihood of less than 10% if the distance between the first audio device and the second audio device is more than 1 m.

22. The method of claim 1, wherein the gain applied in a power amplifier of the second transceiver (61) and/or the gain applied in a low noise amplifier of the second transceiver is controlled in such a manner that a message (PM) containing pairing information from the first audio device (10, 10A) is accepted by the second audio device (14, 10B, 10C, 14A, 14B) with a likelihood of more than 90% if the distance between the first audio device and the second audio device is less than 0.1 m and with a likelihood of less than 10% if the distance between the first audio device and the second audio device is more than 1 m.

23. The method of claim 1, wherein a threshold value of the acceptable minimum reception power at an antenna (38) of the second transceiver (61) is set in such a manner that a message (PM) containing pairing information from the first audio device (10, 10A) is accepted by the second audio (14, 10B, 10C, 14A, 14B) device with a likelihood of more than 90% if the distance between the first audio device and the second audio device is less than 0.1 m and with a likelihood of less than 10% if the distance between the first audio device and the second audio device is more than 1 m.

24. The method of claim 23, wherein the transmission power of the first transceiver (28) is controlled as a function of the threshold value of the acceptable minimum reception power at the antenna (38) of the second transceiver (61) and as a function of an antenna gain of the second transceiver.

25. The method of claim 24, wherein the threshold value is adjustable at the first audio device (10, 10A), with the first audio device communicating the threshold value to the second audio device (14, 10B, 10C, 14A, 14B) via the first transceiver (28).

26. The method of claim 1, wherein the first transceiver (28) and the second transceiver (61) are controlled in such a manner that reception of the pairing information from the first audio device (10, 10A) is accepted by the second audio device (10B, 10C, 14, 14A, 14B) with a likelihood of more than 99% if the distance between the first audio device and the second audio device is less than 0.1 m and with a likelihood of less than 1% if the distance between the first audio device and the second audio device is more than 1 m.

27. A method of establishing a wireless network for audio data transmission comprising a first audio device (10) having a first transceiver (28) and a second wireless audio device (14) having a second transceiver (61), wherein the first audio device is an assistive listening devices designed as an audio signal transmission unit for transmitting audio signals via a wireless RF link and comprises a switch (40) operable by a user (11, 13), and wherein the second audio device is an assistive listening device selected from the group consisting of audio signal transmission units for transmitting audio signals via the wireless RF link and audio signal receiver units for receiving audio signals via the wireless RF link; the method comprising:
  periodically listening, via the second transceiver, at any time during operation of the second audio device, for a pairing request (PRM), at at least one public frequency channel;
  operating the switch by the user to initiate pairing, wherein pairing is initiated by operating the switch by the user at any time during operation of the first audio device;
  transmitting a pairing request via the first transceiver at at least one public frequency channel upon operation of the switch;
  periodically listening, via the first transceiver, at at least one public frequency channel, for pairing information (PIM);
  transmitting, via the second transceiver, after receipt of a pairing request, pairing information containing a network ID at at least one public frequency channel;
  automatically pairing the first audio device to the second audio device upon reception of said pairing information from the second transceiver;
  wherein the first transceiver and the second transceiver are controlled in such a manner that reception of the pairing information from the second audio device is accepted by the first audio device with a likelihood of more than 90% if the distance between the first audio device and the second audio device is less than 0.1 m and with a likelihood of less than 10% if the distance between the first audio device and the second audio device is more than 1 m, and/or that reception of the pairing request from the first audio device is accepted by the second audio device with a likelihood of more than 90% if the distance between the first audio device and the second audio device is less than 0.1 m and with a likelihood of less than 10% if the distance between the first audio device and the second audio device is more than 1 m, and wherein said at least one public frequency channel and the audio data transmission use only frequencies in the range of 2.400 to 2.483 GHz.

28. The method of claim 27, wherein the first audio device (10A), after pairing to the second audio device (14A), periodically listens, via the first transceiver (28), at any time during operation of the first audio device, for a pairing request (PRM), at at least one public frequency channel, from a third audio device (10B), and wherein the first audio device transmits said pairing information (PIM) to the third audio device upon receipt of a pairing request from the third audio device.

29. The method of claim 28, wherein the third audio device (10B) is an audio signal transmission unit.

30. The method of claim 27, wherein said transmitting of the pairing request comprises periodically repeating, in subsequent pairing request periods (PRP), transmission of a pairing request message (PRM) containing said pairing request, via the first transceiver (28), said transmission of the pairing request message occurring in each pairing request period at least once at said at least one public frequency channel; wherein said listening comprises periodically repeating, in subsequent scanning periods (SP), listening, via the second transceiver (61), during a pairing request listening slot (PRLS), at said at least one public frequency channel, for a pairing request message.

31. The method of claim 30, wherein the first audio device (10) stops transmission of the pairing request message (PRM) after having received a message (PIM) containing said pairing information or after a timeout limit of the time having passed since the switch (40) of the first audio device has been operated has been reached.

32. The method of claim 30, wherein the first transceiver (28) listens during each pairing request period (PRP) once during a pairing information listening slot (PILS) at one of the public frequency channels.

33. The method of claim 27, wherein the first audio device is an audio signal transmission unit (10) comprising or being connected to a microphone arrangement (17) for capturing a speakers voice.

34. The method of claim 27, wherein the second audio device is an audio signal receiver unit (14).

35. The method of claim 34, wherein the second audio device is an audio signal receiver unit (14) worn at ear level.

36. The method of claim 35, wherein the audio receiver unit (14) is connected to or integrated within a hearing aid (16).

37. The method of claim 34, wherein the second audio device is an audio signal receiver unit (14) connected to a loudspeaker installed in a room.

38. The method of claim 27, wherein the pairing information (PM, PIM) includes a network ID and rules concerning which audio devices are allowed to pair with which audio devices.

39. The method of claim 27, wherein in said wireless audio data transmission network the audio data is transmitted as audio data packets in separate slots of a TDMA frame structure.

40. The method of claim 27, wherein the switch (40) is operable by a single touch by the user to initiate pairing.

41. The method of claim 40, wherein the switch (40) comprises a press button.

42. The method of claim 26, wherein the first transceiver (28) and the second transceiver (619 are controlled in such a manner that reception of the pairing information from the second audio device (14) is accepted by the first audio device (10) with a likelihood of more than 99% if the distance between the first audio device and the second audio device is less than 0.1 m and with a likelihood of less than 1% if the distance between the first audio device and the second audio device is more than 1 m, and/or that reception of the pairing request from the first audio device is accepted by the second audio device with a likelihood of more than 99% if the distance between the first audio device and the second audio device is less than 0.1 m and with a likelihood of less than 1% if the distance between the first audio device and the second audio device is more than 1 m.

43. A system for establishing a wireless network for audio data transmission comprising a first audio device (10, 10A) having a first transceiver (28) and a second wireless audio device (10B, 10C, 14, 14A, 14B) having a second transceiver (61), wherein the first audio device is an audio signal transmission unit and comprises a switch (40) operable by a user (11, 13), wherein the first and second audio devices are assistive listening devices selected from the group consisting of audio signal transmission units for transmitting audio signals via a wireless RF link and audio signal receiver units for receiving audio signals via the wireless RF link; wherein the switch is operable by the user to initiate pairing at any time;

the first audio device is adapted to transmit, during pairing, pairing information (PM), via the first transceiver, at at least one public frequency channel;

the second audio device is adapted to listen at any time during operation of the second audio device, via the second transceiver, at at least one public frequency channel, for pairing information containing a network ID;

the second audio device is adapted to automatically pair to the first audio device upon reception of said pairing information from the first transceiver;

the first audio device and the second audio device are adapted to control the first transceiver and the second transceiver, respectively, in such a manner that reception of the pairing information from the first audio device is accepted by the second audio device with a likelihood of more than 90% if the distance between the first audio device and the second audio device is less than 0.1 m and with a likelihood of less than 10% if the distance between the first audio device and the second audio device is more than 1 m, and said at least one public frequency channel and the audio data transmission use only frequencies in the range of 2.400 to 2.483 GHz, wherein the second audio device (10B) comprises a switch (40) that is operable by a user (11, 13), and wherein the second audio device is constructed to cause, after pairing to the first audio device (10A), initiation of pairing of a third audio device (10C, 14B) to the second audio device by transmitting at least one message (PM) containing said pairing information via the second transceiver upon operation of the switch of the second audio device.

44. A system for establishing a wireless network for audio data transmission comprising a first audio device (10) having a first transceiver (28) and a second wireless audio device (14) having a second transceiver (61), wherein the first audio device is an assistive listening devices designed as an audio signal transmission unit for transmitting audio signals via a wireless RF link and comprises a switch (40) operable by a user (11, 13), and wherein the second audio device is an assistive listening device selected from the group consisting of audio signal transmission units for transmitting audio signals via the wireless RF link and audio signal receiver units for receiving audio signals via the wireless RF link; wherein the switch is operable by the user to initiate pairing at any time;

the second audio device is adapted to listen at any time during operation of the second audio device, via the second transceiver, at at least one public frequency channel, for a pairing request (PRM) and to transmit, via the second transceiver, after receipt of a pairing request, pairing information containing a network ID (PIM) at at least one public frequency channel;

the first audio device is adapted to transmit, during pairing, a pairing request, via the first transceiver, at at least one public frequency channel, and to periodically listen, via the first transceiver, at at least one public frequency channel, for pairing information;

the first audio device is adapted to automatically pair to the second audio device upon reception of said pairing information from the first transceiver;

the first audio device and the second audio device are adapted to control the first transceiver and the second transceiver, respectively, in such a manner that reception of the pairing information from the second audio device is accepted by the first audio device with a likelihood of more than 90% if the distance between the first audio device and the second audio device is less than 0.1 m and with a likelihood of less than 10% if the distance between the first audio device and the second audio device is more than 1 m, and/or that reception of the pairing request from the first audio device is accepted by the second audio device with a likelihood of more than 90% if the distance between the first audio device and the second audio device is less than 0.1 m and with a likelihood of less than 10% if the distance between the first audio device and the second audio device is more than 1 m; and said at least one public frequency channel and the audio data transmission use only frequencies in the range of 2.400 to 2.483 GHz.

* * * * *